3,830,756
NOBLE METAL CATALYSTS

Moises G. Sanchez, Severna Park, James M. Maselli, Ellicott City, and James R. Graham, Columbia, Md., assignors to W. R. Grace & Co., New York, N.Y.
No Drawing. Filed Aug. 4, 1972, Ser. No. 278,149
Int. Cl. B01j 11/06, 11/08
U.S. Cl. 252—462                 3 Claims

ABSTRACT OF THE DISCLOSURE

The present invention is concerned with catalysts in which the active components are highly dispersed and stable noble metals. In one specific aspect, the invention deals with catalyst useful in the reduction or elimination of noxious components in auto exhaust gases. In another specific aspect, the invention deals with the stabilization of noble metals by selected supports.

BACKGROUND OF THE INVENTION

The problem of air pollution is not a new one. However, the problem has become more and more serious in many cities in recnet years. Most of the pollution is a result of compounds which are derived from unburned or partially burned hydrocarbons found in the exhaust of internal combustion engines.

Several investigators have realized the only practical way to treat exhaust fumes to control hydrocarbon and carbon monoxide pollution is to oxidize the hydrocarbons to carbon dioxide and water and to oxidize the carbon monoxide to carbon dioxide. It is also known that to lower the level of nitrogen oxides ($NO_x$) which are also present in the exhaust gas, it is preferable to reduce the various oxides to free nitrogen. Thus, there is the problem of finding materials capable of not only catalyzing these reactions but also having sufficient chemical and physical stability to withstand the extreme temperature environment which will exist in any catalytic exhaust device.

A wide selection of oxidation catalysts has been produced in the past varying both in chemical compositions and physical structure. With respect to chemical composition, the ability of a wide variety of metals and metal oxides either alone or in combination having the activity necessary to catalyze the complete oxidation of hydrocarbons and carbon monoxide has been noted.

To be sufficiently effective for the removal of hydrocarbons and carbon monoxide from exhaust gases and to meet the standards of maximum emissions currently set by the Environmental Protective Agency, a catalyst for treating exhaust gases most become operational within a very few seconds after engine start-up and must maintain high activity throughout the various modes of engine operation.

The problem of excessively high temperatures which are obtained when high concentrations of pollutants are being oxidized must also be solved in this system. It is not unusual for excursions in catalyst temperature to reach 1800° F. or higher. Present catalytic systems cannot withstand prolonged exposure to these temperatures without thermal or thermo-chemical degradation of the catalyst leading to loss in activity, shrinkage and severe attrition which renders the catalytic device useless.

A particularly suitable support for exhaust catalysts is gamma alumina. At low temperatures the alumina is present as the gamma or other transition forms. However, as the temperature increases these transitional aluminas undergo a phase change to alpha alumina. This is undesirable because it results in a severe loss in surface area and physical strength. These changes in turn lessen the effectiveness of the catalyst because of shrinkage which causes lower activity, gas by-passing and loss of catalyst due to attrition.

The use of noble metals to catalyze the conversion of exhaust gases to innocuous entities is well-known. In addition to being the principal components of these catalysts, several of the noble metals are also used in small amounts to promote activity of base metal catalyst systems. U.S. Pat. 3,189,563 of Hauel, issued June 15, 1965, is typical of the patents relating to the use of noble metal catalysts for the conversion of automobile exhaust gases. U.S. Pat. 3,455,843 to Briggs et al., issued July 15, 1969, is typical of a base metal catalyst system promoted with a noble metal. Unpromoted base metal catalysts have been described in U.S. Pat. 3,322,491 by Barrett et al., issued May 30, 1967.

In our invention, we define the noble metals as platinum, palladium, ruthenium, and rhodium. Whenever possible noble metals are avoided in favor of the less expensive base metals. In the case where noble metals are required they are used in such a form as to minimize the amount required for a given performance. In general, this is achieved by applying the noble metal to a high surface area support which maximizes the specific surface area of the noble metal and consequently its activity per unit weight. Such high surface area supports as silica gels, transition aluminas and silica-alumina gels have been often used in the past. A preferred support in many past applications has been gamma alumina. These supports are quite satisfactory in low temperature applications. For high temperature applications the situation is altogether different. At high temperatures, noble metal catalysts lose activity with use. In systems requiring prolonged exposure to high temperatures, the activity is often reduced dramatically. This, of course, requires frequent catalyst replacements which are inconvenient, time consuming and costly. One of the reasons for the loss of activity of these noble metal catalysts is surface migration of the noble metals at elevated temperatures which results in coalescence of the small particles of noble metals or crystallites into large crystallites. This crystallite growth in turn results in an appreciable loss of specific surface area and hence catalytic activity.

The loss of activity through crystallite growth at elevated temperature is very well documented in the literature. Much work has been reported on the accompanying loss of surface area of the noble metals as measured by chemisorption techniques.

For Example, T. A. Dorling and R. L. Moss report in an article published in The Journal of Catalysis (Vol. 5, pages 111–115) (1966), entitled, The Structure and Activity of Supported Metal Catalysts, as follows:

"The crystallite size of platinum supported on silica was increased by firing in air at temperatures up to 800° C. The mean crystallite size was obtained from X-ray linebroadening measurements and the amount of finely divided platinum, not detectable by X-ray diffraction, was also determined. Metal areas calculated from crystallite size data, taking into account the smaller crystallites, were in agreement with areas obtained from CO chemisorption, assuming that 15% was adsorbed in the bridged structure. The specific activity for benzene hydrogenation (rate per unit metal area) for a number of catalysts, fired below 400° C. and containing varying amounts of finely divided platinum, was essentially constant; catalysts fired at 400° and 500° C., containing predominantly the larger crystallites, had a smaller specific activity and those fired at at 600° and 800° C. were inactive."

The article gives the following data in Table 1:

CRYSTALLITE SIZE, METAL AREA, AND CATALYTIC ACTIVITY (Pt/GRADE 70 SILICA)

| Firing temperature (° C.) | Pt content (percent) | CO chemisorp. flow method (cc./g.) | Metal area (m.²/g.) | Percent benzene converted at 25° C. |
|---|---|---|---|---|
| 120 | 2.75 | 0.75 | 2.06 | 52.0 |
| 250 | 2.30 | 0.27 | 0.74 | 16.6 |
| 300 | 2.03 | 0.17 | 0.47 | 11.3 |
| 400 | 2.56 | 0.11 | 0.30 | 4.7 |
| 500 | 2.09 | 0.01 | 0.03 | 1.9 |
| 600 | 1.95 | 0.01 | 0.03 | Inactive |
| 800 | 1.85 | 0.02 | 0.06 | Inactive |

In another article, published by J. H. Sinfeld in *Catalysis Review*, 3 (2) pages 175–205 (1969), entitled, Catalytic Hydrogenolysis Over Supported Metals, he discusses a rhodium on silica catalyst. The rhodium surface areas and crystallite sizes were determined from measurements of hydrogen and carbon monoxide chemisorption. Some of the catalysts were heated to high temperatures to increase the rhodium crystallite size. Sinfeld gives the following data in Table 4:

| State of dispersion | Crystallite size, A | Specific activity |
|---|---|---|
| 5% Rh, SiO₂ sintered | 127 | 0.41 |
| Intermediate, 1–10% Rh on SiO₂ | 12–41 | 8–16 |
| Very high 0.1–0.3% Rh on SiO₂ | 12 | 4.4 |

Chemisorption techniques have been developed which are capable of differentiating noble metal surfaces from support surfaces. For example, carbon monoxide chemisorption may be used to measure the available surface of certain noble metals catalyst in systems where carbon monoxide is chemisorbed but does not dissolve in the catalyst support. For other noble metals, hydrogen chemisorption is often preferred. The particular technique used, of course, depends on the specific catalyst system under study. Specific pertinent techniques are described later in our disclosure to document our methods of characterization. In general, results may be expressed in moles of chemisorbed compound per gram of catalyst, or moles of chemisorbed compound per gram of noble metal; results may also be expressed in terms of specific surface area such as square meters (m.²) per gram of catalyst or m.² per gram of noble metal.

Another convenient means of expressing results involves the use of a cubic model for the shape of the crystallites in which case one may calculate the average crystalline size ($\overline{X}$) from the following equation:

$$\overline{X} = \frac{6 \times 10^4}{\rho \cdot s}$$

in which $\rho$ is the density of the noble metal in g./cm.³
$s$ is the specific surface area of the noble metal in m.²/g. of noble metal and
$\overline{X}$ is the average crystallite size in A. units.

BRIEF STATEMENT OF THE INVENTION

We have discovered a family of supports for noble metal catalysts which interact with the noble metals to produce a very high degree of dispersion and consequently give catalysts of very high specific noble metal surface area and unexpected high activity. Furthermore, these properties, contrary to the behavior of systems of the prior art, essentially retain all their high specific surface area and activity after severe thermal treatments. Equivalent catalysts prepared on supports of the prior art exhibit lower activity as a result of possessing lower surface area noble metals, and are less stable under thermal treatment than catalysts of the instant invention. For purposes of differentiation, we shall refer to the supports of our invention as "dispersing supports." The unusual behavior and performance of the systems of our invention will become apparent from the following specific descriptions and comparisons of our catalysts.

DETAILED DESCRIPTION OF THE INVENTION

Composition and Characterization Ranges

Because of the very high cost of the noble metals, practical catalysts contain small or trace amounts of noble metals. The range of interest in our systems goes from 2000 to 1 micromoles of noble metals per cubic centimeter of skeleton dispersing support.

For that range of noble metal concentrations the dispersing support should exhibit sufficient specific surface area to at least accommodate one monolayer of the noble metal and preferably to provide excess surface for easy and effective dispersion. The specific surface area of the dispersing support should range from 10 to 1000 m.² per cubic cm. of skeleton dispersing support.

The specific surface area of the noble metal should be as high as possible. We have found out that supports of the prior art give specific surface areas of less than $10^{-2}$ m.²/per micromole of noble metal. Some of our systems give specific surface areas which approach $10^{-2}$ m.2/per micromole of noble metal.

Expressed in different terms, the noble metal crystallites in the catalysts of the prior art are larger than about 50 A. units while the crystallites of the catalysts of the present invention are substantially smaller such as 20 to 30 A. units and sometimes approaching 5–6 A. units. This is indeed a very high degree of dispersion considering that the atomic diameters of noble metals fall in the range of about 2.7–2.9 A. units.

The Dispersing Supports

The key to the unusual degree of dispersion of the catalysts of the instant invention is the type of support used. We have discovered that certain crystalline oxides of high specific surface area interact with the noble metals to give catalysts of unusual and unexpected high degree of dispersion. These crystalline metal oxides are characterized as follows:

They exhibit a specific surface area greater than 10 m.² per cubic cm. of crystalline oxide. Preferably greater than 30 m.²/cm.³ of crystalline oxide.

They exhibit a highly packed oxygen ion lattice in which the size of the oxygen ion ranges from about 2.6 to 2.9 A. units preferably in the range of 2.7 to 2.8 A. units.

They exhibit an interpenetrating cation lattice which consists either of one single chemical element with different valence states or more than one element in solid solution. In the latter case, the main cation in the lattice is replaced by other cations which exhibit a lower valence state (zirconia-calcia for example). In the preferred case the cation lattice should be made up of more than one chemical element each one capable of multivalent states. These supports are present in a concentration of greater than 50 mole percent.

The effect of different valence states in the cation lattice is to create lattice imperfections. When the prevalent cation is partially substituted by cations of lower valence the resulting crystalline structure requires less oxygen ions to achieve electrical neutrality. The result is a defective crystalline structure which exhibits oxygen vacancies. We have found out that crystalline lattices which exhibit oxygen vacancies are excellent dispersing supports for noble metals.

To illustrate our findings we will use the cerium oxide system as a typical crystalline oxide representative of the family of oxides useful in our invention.

Cerium dioxide crystallizes in the fluorite structure. This structure consists of two interpenetrating lattices of face-centered cubic cerium ions and simple cubic oxygen ions. Each cerium is surrounded by 8 oxygens and each oxygen is surrounded by 4 cerium ions. The unit cell dimension of CeO is 5.4110 A. The 0—0 distance is half that value or 2.7055 A. While in the idealized structure there are two oxygens for every cerium atom, the real structures exhibit imperfections.

The most common lattice imperfection is oxygen ion deficiency which results in lattice vacancies. These are mainly caused by:

Reduction of $Ce^{+4}$ to $Ce^{+3}$ by elevated temperatures or by chemical means such as hydrogen treatments.

Lattice substitution of $Ce^{+4}$ by trivalent elements whose oxides are capable of forming solid solutions with $CeO_2$ (such as, for example, other rare earth oxides).

A good summary of work on cerium reduction at elevated temperatures may be found in:

"The Influence of Temperature on the Cerium Oxide System, $CeO_2$—$Ce_2O_3$" by Georg Brauer and Karl Gingerich and "Ordered Intermediate Phases in the System $$CeO_2\text{—}Ce_2O_3"$$

by D. J. M. Bevan.

Reference is made in these articles to the work of others regarding mixed crystals containing vacant oxygen sites. Such oxygen-deficient lattices exhibiting the structure have been reported by:

Zintl and Croatto (1939)—$CeO_2$—$La_2O_3$
McCullough et al. (1950–1952)—$CeO_2$—$Nd_2O_3$
McCullough et al. (1950–1952)—$CeO_2$—$Pr_2O_3$
McCullough et al. (1950–1952)—$CeO_2$—$Sm_2O_3$
McCullough et al. (1950–1952)—$CeO_2$—$Y_2O_3$
Brauer & Gradinger (1951)—$CeO_2Y_2O_3$ These workers agree that the metal ion lattice in these systems is complete, while the oxygen lattice is deficient with oxygen vacancies ranging up "to 40 mole percent."

In general, for every trivalent metal atom substituted in the structure there is half an oxygen vacancy generated. A generalized formula for these systems is:

$$E_{1-x}M_xO_{2-\frac{x}{2}}\square_{\frac{x}{2}}$$

where:

E represents a tetravalent metal such as tetravalent cerium
M represents a trivalent element (including $Ce^{+3}$) and
$x = 0.01$ to 10 atmoic percent
$\square$ represents the oxygen vacancies in the lattice.

Crystalline cerium dioxide of high specific surface area may be prepared by several techniques. For instance one may start with a soluble salt of cerium such as the nitrate, sulfate or chloride and prepare a solution with the desired concentration of added cations such as for example other rare earth elements. The resulting solution may be then mixed under vigorous agitation with an excess of a base such as for example ammonium hydroxide, to cause coprecipitation of the hydrous oxides of the different cations. The resulting hydrogel may then be washed free of electrolytes with water or with a very dilute ammonium hydroxide solution. The washing of electrolytes may be accomplished more readily after spray-drying the hydrogel. In any event, the washed hydrogel may then be air dried to a gel of high surface area. Calcination at different temperatures causes the gel to complete crystallization and allows the preparation of the dispersing support with different specific surface areas and porous structures. This step also achieves homogenous solid solution of the various oxides. Specific surface areas as high as 1000 $m.^2/cm.^3$ of oxides are obtainable by these techniques. Calcination in air or in another atmosphere such as steam will reduce the specific surface area to any desired value within the range of utility of our dispersing supports namely, down to about 10 $m.^2/cm.^3$ of oxides.

The coprecipitation technique described for $CeO_2$ is also applicable to systems in which the main constituents are $ZrO_2$, $PrO_2$, $ThO_2$, $HfO_2$, $TiO_2$ and other stable oxides which are capable of forming solid solutions with "doping" oxides of elements possessing a valence lower than four (preferably three).

Other available techniques are also applicable. For example, the techniques of fluid energy milling with steam at high temperatures such as 800° C., give solid solution oxides of high surface area which exhibit oxygen lattice vacancies. Details of these techniques are given in our copending application Ser. No. 112,031, filed Feb. 2, 1971, which is a continuation-in-part of Ser. No. 723,556, filed on Apr. 23, 1968, entitled, "Progress for Preparing Highly Reactive Powders," both now abandoned and in U.S. Pat. 3,514,252, issued on May 26, 1970, entitled, "Process for Preparation of Stabilized Zirconia Powder."

The fluid energy milling techniques are applicable to any decomposable salt either thermally or hydrothermally or to mixtures of such salts. The technique is also applicable to hydrous metal oxides or coprecipitated hydrous metal oxides mixed with water and/or decomposable salts such as ammonium nitrate, since at elevated temperatures these systems undergo drying and/or decomposition resulting in very small particles of the oxide gels. Other specific although non-limiting examples of dispersing oxide supports are:

Rare earth doped—Zirconium dioxide
Rare earth doped—Hafnium dioxide
Rare earth doped—Thorium dioxide
Scandium doped—Titanium dioxide The term "rare earth" as used herein means any single element or mixture of elements with atomic numbers from 57 to 71 inclusive, plus the element yttrium. Besides the solid solutions of oxides already mentioned one may prepare dispersing supports of certain oxide compounds as long as they exhibit the properties described for the oxide systems. For example, a high surface area crystalline zirconium silicate in which some of the zirconium ions have been replaced by rare earth ions is a suitable dispersing support. The preparation of such a material can be achieved by reacting a solution of sodium metasilicate with a solution of zirconyl chloride containing the desired level of rare earth chlorides. Best results are obtained by insuring instantaneous mixing of the solutions under strong agitation. The use of a slight excess of NaOH in the silicate solution insures the complete coprecipitation of all the oxides by achieving a final pH between 8 and 9. Washing of the electrolytes, drying and calcining provides the desired end product.

The Catalysts

Once the dispersing support is prepared it can be impregnated with a soluble salt of the desired noble metal or mixture of noble metals such as for example, palladium nitrate, chloroplatinic acid, etc. Impregnation may also be done using a noble metal soluble complex such as for example, palladium, tetraamine dinitrate. Usually the impregnation is followed by air calcination to complete the decomposition of the impregnating noble metal salt or complex to the metal form or to the corresponding oxide. High temperature calcinations are sometimes used to achieve maximum metal dispersion. The level of noble metal used varies depending on the application of the catalysts. In general, it is low or in the range of 2000 to 1 micromoles per cubic centimeter of crystalline oxides, preferably below 100.

The resulting catalyst powder may be formed into particulate catalysts by extrusion, pelleting, balling, etc., or it may be applied to a monolith. In certain applications, it is desirable to form the dispersing support first and then impregnate or spray impregnate the solution of noble metals to the formed particles. In the latter case, the noble metal is concentrated on the outer layers of the formed particle where most of the catalytic reaction takes place due to ease of accessibility. This technique maximizes noble metal availability and often results in appreciable reduction of noble metal usage for a given application and corresponding savings.

In other applications, the powdered catalyst is milled to reduce its particle size to the point where it can be dispersed into an appropriate solvent to form a slip. The slip, in turn, is used to impregnate preformed geometrical shapes such as a ceramic monolith and the like commonly used in catalytic applications. Impregnation is followed by drying at temperatures of 100–300° F. and firing at temperature of 1000° to 1800° F. for about 0.5 to 10 hours to affix the catalyst particles to the surface of the geometric carrier.

The catalysts of our invention which consist of highly dispersed noble metal on a crystalline oxide phase may be used either in pure form or they may be dispersed in an inert or active matrix. For example, a catalyst consisting of palladium highly dispersed on cerium dioxide may be milled to reduce its particle size and then blended with an inert matrix such as finely divided alumina or finely divided silica. In general, for optimum performance of these blended systems, it is desirable to have the active catalyst systems of our invention in very finely divided form to maximize accessibility and activity. The particles to be dispersed in the matrix should be preferably smaller than 50 microns. The lower limit of the particle size range being the size attainable by practical milling techniques. In general, these techniques are capable of attaining particle sizes down to about 0.5 microns. These systems are fundamentally different from systems obtained by impregnation techniques in which the size of the impregnated substance such as, for example, cerium dioxide is much smaller than half of micron. A variation of the systems described above consists of blending the dispersing support with the matrix prior to addition of the noble metals forming the powder into the required shapes (pellet, extrudate, balls, etc.) and then spray impregnate the noble metal solution onto the surface of the granular material. In this manner, the noble metal is highly concentrated on the periphery of the granules and is readily accessible and consequently much more active. Another variation is the use of a blending matrix which by itself exhibits catalytic activity.

Characterization Techniques

The various systems or components described may be characterized for fundamental properties by well-known techniques.

The crystalline character of the dispersing support is determined by X-ray diffraction. This technique also shows the solid solution character of the system when more than one oxide is present.

The oxygen deficiency in the lattice is determinable from the crystal structure as established by X-ray diffraction and from chemical composition. In certain cases small concentration of vacancies is observable through known color changes which have been reported in the literature for such systems. When the oxygen deficiency is appreciable, density measurements may be used to determine its level. This is done in conjunction with X-ray diffraction data, unit cell dimensions and chemical composition. Finally, in certain materials the oxygen deficiency is accompanied by a marked increase in electrical conductivity. In the dispersing supports of our invention the concentration of oxygen lattice vacancies may range upwards of 0.01 atomic oxygen percent, although in most practical cases the concentration exceeds 0.1%. There is no reason to establish an upper limit to the concentration of oxygen vacancies as long as it does not affect the crystalline phase of the dispersing support. In practice concentrations in excess of 10 atomic oxygen percent do not result in improved dispersibility of the noble metals within the stated concentration range of 1–2000 micromoles of noble metals per cubic centimeter of crystalline oxide phase. The preferred range of oxygen vacancies in the lattice is from 0.1 to 5 atomic oxygen percent. For the purpose of our invention the concentration of oxygen lattice vacancies is calculated from the equation.

$$01 = C0 \left(1 - \frac{FR + \sum_i f_i r_i}{R}\right)$$

in which:

C = concentration of oxygen lattice vacancies expressed in atomic oxygen percent
F = main cation fraction with respect to total cations (the main cation is the one which determines the overall crystal structure of the oxide system)
R = atomic ratio of oxygen to main cation in its corresponding pure oxide.
$f_i$ = impurity or dopant cation fraction of the $i$th cation
$r_i$ = atomic ratio of oxygen to dopant $i$th cation in its corresponding pure oxide.

For example for the system:

$$[CeO_2]_{0.90}[LaO_{1.5}]_{0.08}[YO_{1.5}]_{0.02}$$

Cerium is the main cation while lanthanum and yttrium are the impurity or dopant cations. The structure of the system is determined by the cerium which gives a defect fluorite structure.

In this system.

F = 0.90          R = 2.00
$f_1$ = 0.08      $r_1$ = 1.50
$f_2$ = 0.02      $r_2$ = 1.50 which give the value of 2.5 atomic oxygen percent from the equation discussed previously for the number of lattice vacancies. The solid solution of that composition may be written as $$Ce_{0.9}La_{0.08}Y_{0.02}O_{1.95}\square_{0.05}$$

where $\square$ represents the oxygen lattice vacancies while the other symbols have their usual meaning.

The degree of dispersion of the noble metal may be determined by chemisorption techniques using gases which chemisorb on the available surface of the noble metal but are not picked up by the dispersing support. The amount of chemisorbed gas per unit weight of noble metal is a relative measure of the specific surface area of the noble metal. As indicated earlier results may be expressed in moles of chemisorbed gas per gram of noble metal. They may also be expressed as a specific surface area which requires a prior knowledge of the number of chemisorbed molecules per atom of noble metal as well as the cross sectional surface area of the noble metal atom. This latter quantity is calculable from crystal data available in the literature. Finally, through the use of a cubic model one may calculate the average crystallite size of the noble metal. Regardless of the different means of expressing the results or for that matter the absolute accuracy of the numbers, these determinations provide a good relative measure of the degree of dispersion of the noble metals. In our measurements we have used the results to establish comparisons between the catalysts of our invention and catalysts of the prior art which clearly show the superior degree of dispersion achievable through our techniques in our systems.

The technical literature contains many articles on chemisorption techniques to measure specific surface areas of noble metals. The following articles are given as references:

*Palladium Areas in Supported Catalysts*: Determination of Palladium Surface Areas in Supported Catalysts by Means of Hydrogen Chemisorption, By: P. C. Aben, Journgal of Catalysts 10, 244–229 (1968)

*The Determination of the Free-Metal Surface Area of Palladium Catalysts*: By: J. J. F. Scholten and A. Van Montfoort, Journal of Catalysts 1, 85–92 (1962)

The chemisorption technique used to measure our catalysts is an improved modification of the techniques available from the literature. The method is as follows:

A rapid method for determining the surface area of palladium was developed using a hydrogen adsorption-desorption technique. The method described below makes partial use of the hydrogen chemisorption technique reported in the literature by C. E. Hunt (J. of Catalysis 23, 93 (1971)), and the phenomenon reported by L. J. Gillespie and F. P. Hall (J. Chem. Soc. 48 1207 (1926)) that hydrogen shows very little solubility in palladium at room temperature (21° C.) if the pressure of the hydrogen is kept below about 15 mm. Hg.

The apparatus used for the chemisorption measurements was a PerkinElmer-Shell Sorptometer. A single carrier gas of 2 volume percent $H_2$ in $N_2$ (or Ar) was used for initially reducing the sample, for adsorption of $H_2$ at 21° C. and as the purge gas for carrying the desorbed hydrogen to a chromatographic type TC detector. The experimental procedure consisted of (1) reducing 0.05 to 0.5 g. of catalyst sample held in a U-tube with the carrier gas (2% $H_2$ in $N_2$) at 430° C., using a molten lead bath for 15 minutes (2) removing the sample from the lead bath and allowing it to cool to room temperature (3) allowing the $H_2$ from the carrier gas stream to adsorb on the supported palladium catalyst for 5 minutes (4) rapidly heating the catalyst to 420° C., using the molten lead bath, to desorb chemically bonded hydrogen and (5) measuring the amount of hydrogen desorbed from the peak area recorded by the chromatographic-type detector.

From the hydrogen peak area the amount of hydrogen chemisorbed in terms of micromoles $H_2$/gram of noble metal is found using the following equation:

$\mu$ moles $H_2$/g. noble metal = U $$= \frac{Pa}{Ta} \left[\frac{273}{760}\right] \left[\frac{10^{-6}}{22414}\right] \frac{ccH_2}{\text{Sample wt.} \times \text{fraction noble metal}}$$

where

Pa and Ta are pressure and temperature at detector $ccH_2$ = GC factor × attenuation × integrator counts.

Assuming one atom of hydrogen chemisorbs on one exposed metal atom and that the area of a single Pd atom is 8.0 A. the specific surface area, S.A., expressed in m.$^2$/gram of noble metal can be calculated as follows:

S.A. (m.$^2$/g. Pd (Pt)) = U × 8.0 A.$^2$ × $10^{-20}$ m.$^2$/A.$^2$
$\qquad \times 6.023 \times 10^{23} \times 10^{-6}$
$\qquad = U \times 4.818 \times 10^{-2}$ The catalytic activity of our systems may be determined by different methods depending on the specific use of the catalyst. In the case of catalysts directed to abate the noxious gases in automobile exhaust the best technique is to install catalytic systems in automobiles and to test them under actual operating conditions. However, such methods of testing are very complex, time consuming and costly. For the purpose of determining the activity of a catalyst it is more convenient and practical to use laboratory techniques which duplicate the various conditions encountered in an operating automobile.

The catalytic performance of the systems may be evaluated using two methods. One of the methods simulates an exhaust gas environment in a bench sized apparatus. This method is described later. The other method utilizes the procedure for chassis testing described in detail in the Federal Register of July 1970, as modified by the instructions in the Federal Register, 1971. Both of these publications are incorporated herein by reference. This method is often referred to as the Environmental Protection Agency (EPA) Federal Test Procedure (FTP).

Broadly speaking, the chassis evaluation is designed to determine the hydrocarbon, carbon monoxide and oxides of nitrogen in gas emissions from an automobile while simulating the average trip in an urban area of 7½ miles from a cold start. The test consists of engine start up and vehicle operation on a chassis dynamometer through a specified driving schedule consisting of a total of 1371 seconds. A proportionate part of the diluted gas emissions is collected continuously for a subsequent analysis using a constant volume sampler.

The dynamometer run consists of two tests, a cold start test after a minimum of 12 hours soak, and a hot start test with a ten-minute soak between the two tests. Engine start up and operation over a driving schedule and engine shut down constitutes the complete cold start test. Engine start up and operation over the first 505 seconds of the driving schedule completes the hot start test.

The engine emissions are diluted with air to a constant volume and a portion sampled in each test. Composite samples are collected in bags and analyzed for hydrocarbons, carbon monoxide, carbon dioxide, and oxides of nitrogen. Parallel samples of diluted air are similarly analyzed for hydrocarbons, carbon monoxides, and oxides of nitrogen. The gas samples are analyzed for hydrocarbons by a flame ionization detector and for carbon monoxide and carbon dioxide by nondispersive infrared analysis. Nitrogen oxides are determined by nondispersive infrared and ultraviolet analysis. The gasoline used in this test is 100 octane gasoline containing less than 0.5 grams of organic lead per gallon.

The most crucial period during the EPA cold start Federal Test Procedures is the first 120 seconds after the cold engine is started. During this 120 seconds, most vehicles exhaust emissions levels are high enough that in no reduction in emissions has occurred, the vehicle cannot meet the 1075 EPA standards of 0.41 g./mile HC and 3.40 g./mile CO even if 100% removal of CO and HC can be achieved after this point. We have found from experience that if a catalyst has not achieved at least 50% conversion of both CO and HC after the first 60 seconds of the EPA test, it will not be effective enough to meet the emissions standards.

The laboratory testing unit we use was designed to as closely as possible on a bench test simulate exhaust and heat up conditions experienced by the catalyst during the first 60 seconds of an actual chassis dynamometer test. The testing unit consists of the following parts (1) a synthetic exhaust gas mixture and approximate flow controllers, (2) a vaporizer for introducing water into the synthetic gas stream, (3) a preheater for raising the temperature of the exhaust gas to 1000° F. (4) a converter can be located below the preheater for holding the catalyst sample, (5) a three-way valve which is used to direct the exhaust gas flow either to by-pass or over the catalyst and (6) approximate analytical equipment and recorders so that plots of CO and HC conversions versus both temperature and time can be made.

A typical catalyst test is carried out under the following conditions:

Gas Hourly Space Velocity = 38,000 Hr.$^{-1}$
Carbon Monoxide = 6.5 Vol. percent
Hydrocarbons = 1700 p.p.m. carbon (as hexane)
Oxygen = 4.5 Vol. percent
Water Vapor = 10 Vol. percent
Nitrogen = Balance At the beginning of a run the three-way valve is closed to the reactor side. The reactor containing the catalyst to be tested is first connected to the line attached to the three-way valve, then quickly connected to the connector. Once the reactor (at room temperature) is connected, the carbon monoxide (CO) and hydrocarbons (HC) concentrations are established at the proper levels and then at time zero the exhaust flow is diverted to the reactor. Simultaneous time convervsions traces are obtained for CO and HC. Generally, three runs (with rapid air cooling in between) are necessary to establish the activity.

The testing unit is calibrated daily with a reference catalyst (See Example 6) which describes our reference catalyst).

Performance of a given catalyst is given by the percent of carbon monoxide removed as a function of time. Good catalysts achieve high percentage removal in short times. The design of the bench testing equipment and the testing conditions have been selected to obtain an excellent correlation between the bench results and the EPA Federal Testing Procedure.

The bench unit may be used to test catalysts in either granular form or on monolithic structures. Monoliths for bench evaluation are one inch in diameter by one inch long. Granular catalysts are approximately 3 x 4 mm. in size and fill 13 cc. of the reactor volume.

The catalsyts of the instant invention are useful in the reduction or elimination of noxious components in auto exhaust gases. They are applicable as oxidation catalyst in the elimination of carbon monoxide and hydrocarbons. The high dispersion character of our catalysts make them also useful in the elimination of $NO_x$ gases under the reducing conditions prevailing in the auto exhaust prior to air injection.

While the theoretical account of the phenomena involved in our invention is not necessary, the following plausible explanation is given to provide some theoretical background to our discovery.

Crystallite oxide phases containing oxygen lattice vacancies exhibit some of the vacancies on their surface. These surface vacancies appear as holes or nests which exhibit the dimension of the missing oxygen ion; namely, about 2.7 angstrom in diameter. These vacancies are capable of accommodating single atoms of noble metals such as palladium, platinum, etc., since their dimensions are practically the same as the oxygen ion dimension.

Vacancies, and in particular, surface vacancies may be incorporated into the crystalline network by cation substitutions with cations of lower valence state by thermal treatments at elevated temperatures to eliminate oxygen or by chemical reduction of the cations such as $Ce^{+4}$ reduction to $Ce^{+3}$ through hydrogen treatments at elevated temperatures. Combinations of all of these will obviously also produce the desired effect.

The presence of the surface vacancies or nests provides stable sites for the noble metals, since they would be surrounded by neighboring atoms (most likely oxygen) with which they can interact to form bonds. Nested noble metal atoms would not migrate over the surface of the dispersing support as they would over normal surfaces. We have already discussed the crystallite growth of noble metals at high temperatures earlier in our disclosure. This growth and accompanying loss of catalytic activity is due to the surface migration of the noble metals at elevated temperatures. In regular supports, the noble metals are not surface bound, and consequently, are capable of migrating over the surface and coalesce to large crystallites.

In the supports of our invention, the surface lattice vacancies act as nests and anchor the noble metals preventing or reducing their migration and consequently eliminating or reducing crystal growth and accompanying loss of activity. The net result is excellent dispersion and thermal stability.

Our invention is further illustrated in the following specific but nonlimiting examples:

EXAMPLE NO. 1

This example describes the preparation of a high surface area crystalline oxide as a support for a noble metal oxidation catalyst.

Three pounds of cerous nitrate octahydrate were dissolved in 9 liters of water. The cerous nitrate had a purity of 99%. The main impurities consisted of other rare earth elements. The cerous nitrate solution was neutralized with a solution of ammonium hydroxide containing about 9% equivalent $NH_3$. The reaction was carried out by pumping the two solutions independently into a small volume reaction chamber equipped with a high speed stirrer. The rate of addition of the ammonium hydroxide was used to control the pH at between 9 and 10. The resulting hydrogel had a pH of 9.8. It was dewatered by vacuum filtration, vacuum dried at 50° C. and washed three times with water adjusted to pH 8 with ammonium hydroxide to remove undesirable electrolytes. After washing, the hydrogel was dried at 110° C. for 16 hours.

The resulting gel was converted to the high surface area crystalline form of cerium oxide $CeO_2$ by calcination. Table I gives the calcination conditions and the surface areas obtained. Table II compares the experimentally obtained X-ray diffraction pattern with ASTM Card No. 4–0593 values for $CeO_2$.

TABLE I

| 4 Hours at T, ° F.: | Surafce Area (m.²/cm.³) |
| --- | --- |
| 800 | 577 |
| 1400 | 110 |
| 1800 | 10 |

TABLE II.—X-RAAY DIFFRACTION DATA

| Sample from Example 1 "d" spacing | intensity | $CeO_2$ from ASTM data | |
| --- | --- | --- | --- |
| 3.12 | 100 | 3.12 | 100 |
| 2.70 | 30 | 2.71 | 29 |
| 1.91 | 51 | 1.91 | 51 |
| 1.63 | 42 | 1.63 | 44 |
| 1.56 | 6 | 1.56 | 5 |
| 1.35 | 6 | 1.35 | 5 |

EXAMPLE 2

This example illustrates the preparation of a noble metal catalyst utilizing the high surface area crystalline cerium dioxide prepared by the procedure decribed in Example 1.

The cerium oxide powder that had been dried to 110° C. was mixed with 2% by weight Sterotex and 2% by weight polyvinyl alcohol and pelleted in 5/32" pellets. The pellets were calcined in air for 4 hours at 1400° F. to convert them to crystalline $CeO_2$. The surface area was found to be 110 m.²/m.³. The bulk density was 2.65 g./cc.

Fifty-three ml. of palladium tetraamine denitrate solution containing the equivalent of 7.16 mg. Pd were applied to 79 grams of cerium dioxide pellets. The impregnated pellets were then calcined for 4 hours at 1400° F. The final composition was 0.009% palladium and the balance was cerium dioxide.

EXAMPLE 3

This example illustrates the fact that the catalyst prepared in Example 2 has exceptionally high palladium surface area.

The surface area of the palladium distended on the catalyst described in Example 2 was measured utilizing the hydrogen chemisorption technique described in the text. The results clearly show the exceptional degree of palladium dispersion obtained when the high surface area crystalline support, $CeO_2$, is used as the base for the noble metal. The palladium surface area measured 6180 m.²/cm.³ of palladium. The average crystallite size was calculated to be 9.7 A. units.

EXAMPLE 4

This example illustrates the excellent catalytic activity for the oxidation of carbon monoxide exhibited by the catalyst prepared in Example 2.

The catalytic activity of the catalyst described in Example 2 was evaluated by measuring the time in seconds required to convert the carbon monoxide contained in a preheated synthetic auto exhaust gas mixture flowing over the catalyst held at room temperature. The full details of the evaluations procedure are given in the text. The data are set out in Table III.

TABLE III

Catalytic Activity of Catalyst from Example 2

| Time (seconds): | Percent CO Converted |
|---|---|
| 50 | 10 |
| 60 | 15 |
| 70 | 32 |
| 80 | 64 |
| 90 | 86 |
| 100 | 96 |

EXAMPLE 5

This example illustrates the ability of the catalyst from Example 2 to retain catalytic activity after being exposed to severe thermal environments even though the catalyst contains essentially only "trace" amounts of palladium (0.009%).

After the test described in Example 4, the catalyst was heated for 24 hours at 1800° F. After the heat treatment the catalytic activity was evaluated using the same method used to generate the data in Table III. The catalytic activity after the high temperature exposure is set out in Table IV.

TABLE IV

Catalytic Activity of Catalyst from Example 2 After Exposure to 24 hours at 1800° F.

| Time (Seconds): | Percent CO Converted |
|---|---|
| 50 | 4 |
| 60 | 5 |
| 70 | 8 |
| 80 | 12 |
| 90 | 20 |
| 100 | 36 |
| 120 | 77 |
| 140 | 95 |

EXAMPLE 6

This example relates and correlates the activity as measured by the bench test data set out in Examples 4 and 5 to a reference catalyst in actual performance in controlling carbon monoxide from a vehicle.

Table V compares the activity data measured on the bench unit described in the text for the catalyst of Example 2 and a reference catalyst described in co-pending application No. 271,856 filed July 14, 1972 entitled Ultra Stable Exhaust Catalyst, now abandoned.

The performance of the reference catalyst was measured utilizing the Federal EPA driving test on a chassis dynamometer. It removed 89% of the carbon monoxide from the vehicle exhaust.

TABLE V.—COMPARISON OF ACTIVITY OF REFERENCE CATALYST WITH CATALYST FROM EXAMPLE 2

| | Percent CO converted | |
|---|---|---|
| Time (seconds) | Reference catalyst | Catalyst from Ex. 2 |
| 50 | 10 | 10 |
| 60 | 10 | 22 |
| 70 | 32 | 45 |
| 80 | 64 | 76 |
| 90 | 86 | 90 |
| 100 | 96 | 95 |

This data indicate the catalyst from Example 2 performs approximately as well as the reference catalyst in removing CO in the bench test and should also be as effective under the EPA, FTP.

EXAMPLE 7

This example illustrates the preparation of a crystalline oxide of high surface area that can be used as a support for a noble metal catalyst.

Zirconyl chloride octahydrate, $ZrOCl_2 \cdot 8H_2O$ was dissolved in water to prepare an aqueous solution containing the equivalent of 360 g. $ZrO_2$. The pH of the solution was 0.35. With strong stirring the temperature was raised to 95° C. Concentrated ammonium hydroxide (288 ml.) was added to the zirconyl chloride solution to precipitate a zirconia hydrogel at the rate of 1.6 ml./minute until the pH of the mixture had reached 1.7. The hydrogel was filtered and the filter cake was slurried once in water. One hundred and thirty-seven grams admixed rare earth chloride solution containing the equivalent of 39.6 g. of the mixed rare earth oxides were added to the slurry of zirconia hydrogel. The mixture was stirred vigorously while 170 ml. of 6M $NH_4OH$ solution was added. The slurry set up to a stiff gel. One liter of water was added to reslurry the mixture. The pH at that point was 6.1. One hundred more ml. of 6M $NH_4OH$ was added to bring the pH to 8.1. The slurry was filtered three times with water to remove the ammonium chloride.

After drying for 16 hours at 110° C. the product was calcined at different temperatures and the surface area measured. The surface area data are set out in Table VI using a calculated density of 6.3 g./cm.$^3$ for the mixed zirconia-rare earth oxide systems.

TABLE VI

Surface Area of Zirconia—Rare Earth Oxide Mixture

| 4 hours at T, ° F. | Surface Area m.$^2$/cm.$^3$ |
|---|---|
| 800 | 636 |
| 1400 | 221 |
| 1800 | 88 |

EXAMPLE 8

This example illustrates the use of the powder prepared in Example 7 as a support for a noble metal catalyst.

The zirconia-rare earth oxide powder prepared by the procedure described in Example 7 was mixed with 2% by weight Sterotex and 2% by weight polyvinyl alcohol and pelletized to 5/32" pellets and calcined 4 hours at 1800° F. The pellets were then heated to 250°–300° F. and were contacted with 100 ml. of a palladium tetrammine nitrate solution containing 0.54 mg. palladium per ml. of solution. After the application of the palladium tetrammine denitrate solution the catalyst was heated for 4 hours at 1800° F. The final catalyst composition was 0.04% palladium and the balance was the support.

EXAMPLE 9

This example illustrates the evaluation of the catalytic activity by the method used for Example 5, Table III.

TABLE VII

Catalytic Activity of the Catalyst of Example 8

| Time (Seconds): | Percent CO Converted |
|---|---|
| 50 | 2 |
| 60 | 2 |
| 70 | 3 |
| 80 | 5 |
| 90 | 7 |
| 100 | 22 |
| 110 | 38 |
| 130 | 92 |
| 140 | 97 |

EXAMPLE 10

This example illustrates the preparation of a catalytic monolith.

The high surface area ceria prepared in Example 1 is subjected to fluid energy milling in order to reduce the average particle size down to 2–4 microns. A slip is prepared using a high speed high shear mixer by dispersing 200 g. of milled ceria in 350 g. of 0.4 wt. percent Polyox solution, 6 g. palladium (added as 60 ml. Pd (NO₃)₂ solution containing 0.1 g. Pd/ml.), enough HNO₃ to adjust pH to 3.5 and enough water to bring total solids content of the slip to 35 wt. percent.

After mixing for 5 minutes with the high shear mixer, the slip is ready to be used as a coating slurry for a monolith. A cylindrical monolith 4.65" diameter x 3 inches with 8 channels per inch and 8 mil thicknesses weighing 450 grams is completely dipped into the palladium-ceria slip. Excess slip is removed from the monolith channels by blowing with compressed air. After drying in a forced draft oven at 250° F. for 3 hours, and calcining three hours at 1000° F., the coated monolith is found to weigh 500 grams. This method yields a catalyst that contains 10 wt. percent Pd-ceria as a coating and an overall palladium level of 0.30 wt. percent. This catalyst, under the EPA test procedure, will perform satisfactorily.

EXAMPLE 11

The cerium dioxide crystalline phase described in Example 1 is impregnated with palladium tetrammine dinitrate solution as described in Example 2, but to a level of 0.1% palladium. The resulting powder is milled down to an average particle size of about 2 microns. The resulting finely divided powder is mixed with 9 times its weight with a gamma alumina which had been previously treated at 1000° C. for 4 hours in order to achieve stabilization. The blended powders are pelleted into cylindrical pellets 4 mm. in diameter by 3 mm. thick. The pelleting is done using 2% by weight of polyvinyl alcohol mixed with 2% by weight of Sterotex. The pellets are calcined in air for 4 hours at 1400° F. to burn off the organic residue. The catalyst, when tested in the bench unit will give comparable results to those given in Example 4.

EXAMPLE 12

A thorium nitrate and samarium nitrate solution containing 8 w/o equivalent ThO₂ and 2 w/o equivalent Sm₂O₃ is neutralized with excess ammonium hydroxide containing 9 w/o equivalent NH₃. The mixing is carried out by pumping the two solutions at controlled rates into a small reactor chamber with a high speed stirrer which provides very strong agitation and instantaneous mixing. The relative pumping rates are adjusted to give a hydrogel of pH 9.6.

The resulting co-gel is vacuum filtered to remove excess water and electrolytes, and then primary dried under vacuum at 50° C. overnight to facilitate its washing. The resulting product is washed with a very dilute ammonium hydroxide aqueous solution of pH 8.0 until the removal of nitrate ions is essentially completed. The washed co-hydrogel is dried at 110° C. overnight to produce a co-gel of ThO₂—Sm₂O₃. This co-gel is calcined at 1000° F. to complete crystallization. The resulting product exhibits the fluorite structure as measured by X-ray diffraction techniques. The resulting dispersing support is ball milled and then impregnated with a solution of platinum tetrammine dinitrate to achieve a platinum concentration of 3 w/o after calcination to decompose the platinum compound. The resulting powder is prepared into a slip which is used to impregnate a monolith. The techniques used are the same as those employed in Example No. 10.

The final concentration of platinum in relation to the total weight of the finished monolith will be 0.30 w/o.

What is claimed is:

1. As a composition of matter a catalyst consisting essentially of a fluorite crystalline oxide phase having the empirical formula:

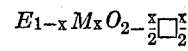

in which:

E represents a tetravalent metal which is selected from the group consisting of tetravalent cerium, thorium, hafnium, zirconium, tetravalent titanium, tetravalent praseodymium and mixtures thereof;

M represents a trivalent doping element selected from the group consisting of the trivalent rare earth metal, yttrium, scandium and mixtures thereof;

$x$ is the atomic fraction of doping metals in the oxide crystalline phase and $x$ has a value of 0.01 to 10 atomic percent; and ☐ represents the oxygen vacancies in the lattice;

said crystalline oxide phase exhibiting lattice imperfections in the form of oxygen vacancies, a specific surface area of 10 to 1000 square meters per cubic centimeter of crystalline oxide phase, and having distended over its surface noble metals or mixtures of noble metals in the form a very small crystallites.

2. The catalyst according to Claim 1 wherein the noble metal is in the form of crystallites in the 5 to 30 angstrom size range.

3. The catalyst according to Claim 1 wherein the noble metal is selected from the group consisting of platinum, palladium and mixtures thereof.

References Cited

UNITED STATES PATENTS

| | | | |
|---|---|---|---|
| 3,331,787 | 7/1967 | Keith et al. | 252—466 PT |
| 3,619,127 | 11/1971 | Hass et al. | 423—214 |
| 3,524,721 | 8/1970 | Stephens | 423—213 |

DANIEL E. WYMAN, Primary Examiner

W. J. SHINE, Assistant Examiner

U.S. Cl. X.R.

252—461, 466 PT, 472; 423—213.2, 213.5